United States Patent

[11] 3,577,057

[72] Inventor George A. Dyer
Santa Ana
Emil Kohler, Anaheim, Calif.
[21] Appl. No. 861,397
[22] Filed Sept. 26, 1969
[45] Patented May 4, 1971
[73] Assignees North American Rockwell Corporation

[54] SYSTEM FOR CONTROLLING THE SPEED OF A MOTOR UTILIZING PULSE WIDTH MODULATION
8 Claims, 8 Drawing Figs.
[52] U.S. Cl. .................................................. 318/328,
318/329, 318/341
[51] Int. Cl. ...................................................... H02p 7/14
[50] Field of Search .......................................... 318/316,
317, 329, 341, 345, 230, 231, 328

[56] References Cited
UNITED STATES PATENTS
3,436,635 4/1969 James et al. .................. 318/341X
*Primary Examiner*—Oris L. Rader
*Assistant Examiner*—H. Huberfeld
*Attorneys*—L. Lee Humphries, H. Fredrick Hamann and Robert G. Rogers ABSTRACT: An input voltage is summed with a voltage picked off from a polyphase motor for driving a voltage-controlled oscillator. The frequency of the output signal from the oscillator is dependent on the magnitude of the summed voltage. The pulse width is modified within a predetermined range as a function of the frequency and is converted into three phase signals which are summed and applied to the stator windings of a motor. The signal across the windings has an optimum voltage and frequency ratio which is varied when the speed of the motor is changed.

SYSTEM FOR CONTROLLING THE SPEED OF A MOTOR UTILIZING PULSE WIDTH MODULATION

BACKGROUND OF THE INVENTION

1. Field of the Invention

The invention relates to a system for controlling the speed of a motor and, more particularly, to such a system in which the pulse width of a drive signal is modified within a predetermined range to provide a drive signal to a polyphase motor which has constant voltage/frequency ratios for various motor speeds.

2. Description of the Prior Art

The need for new and improved motor speed control systems is described in U.S. Pat. No. 3,323,032, for an ELECTRIC DRIVE SYSTEM by Paul D. Agarwal et al., issued May 30, 1967 (CL. 318—321).).

The patent describes a voltage-switching device used in a variable speed drive system for generating a plurality of differing voltage levels for controlling the performance of an AC motor. As shown in FIG. 1 of the patent, the system includes a DC source, a voltage switch which receives the DC source and the voltage representing the motor position. The output from the voltage switch is converted into square wave signals by a static inverter for driving the motor. The different voltage levels are provided by the voltage switch.

A system is preferred in which variations in motor speed due to loading or changes in input voltages are detected and use to control the voltage/frequency ratio of the drive signals for the motor. The ratio should be constant for all values of motor speed so that the motor can perform according to its designed torque and speed. If the speed is controlled by a single variable such as frequency, the number of components, system size, weight and cost could be substantially reduced. The present invention provides such a system.

SUMMARY OF THE INVENTION

Briefly, the invention comprises a system for controlling the speed of a polyphase motor operating from a DC or AC voltage input source. The invention comprises means for generating a signal having a frequency as a function of the difference between an input voltage and the output voltage from the motor. The pulse width of the signal is modified over a predetermined frequency range.

Polyphase signals are generated from the modified pulse width signal and are selectively added to provide polyphase drive signals to the stator windings which have a constant voltage/frequency ratio for the various motor speeds involved. The range of operating motor speeds also determines the frequency range over which the pulse width of the above-mentioned signal can be modified. As a result, regardless of the speed desired, the voltage/frequency ratio is held constant. The frequency can be varied as a function of the desired speed by varying the input voltage. The voltage is held constant by the selective adding of the polyphase modified pulse width signals.

At relatively low motor speeds (and therefore relatively low frequency drive signals), a minumum average voltage is applied to the stator windings of the motor to provide a starting torque. In that case, the voltage/frequency ratio may be other than a constant for optimum operations.

Therefore, it is an object of this invention to provide an improved system for controlling the speed of a polyphase motor.

It is another object of this invention to provide a system generating continuously variable drive signals for controlling the variable speed of a polyphase induction motor operating from a DC or AC voltage source.

It is another object of this invention to provide an improved motor speed control system in which the only variable of the system is frequency and in which voltage tracking for the motor is obtained without the need for a separately designed pulse width modulator circuit.

A still further object of the invention is to provide a polyphase motor speed control system having a relatively reduced overall size, weight, and cost.

A further object of the invention is to provide a polyphase motor speed control system in which the voltage/frequency ratio of the drive signals is held optimized constant by varying the frequency of a signal generated by turning on an input signal and a pickoff signal from the motor.

These and other objects of the invention will become more apparent when taken in connection with the description of drawings, a brief description of which follows:

BRIEF DESCRIPTION OF DRAWINGS

FIG. 2 $b$ is an illustration of input and output signals of the FIG. 2 $a$ generator.

FIG. 4 $b$ is an illustration of input and output signals from the FIG. 4 $a$ network.

FIG. 5 $b$ is a diagram of the input and output signals to the FIG. 5 $a$ three-phase inverter.

DESCRIPTION OF THE PREFERRED EMBODIMENT

Figure 1:
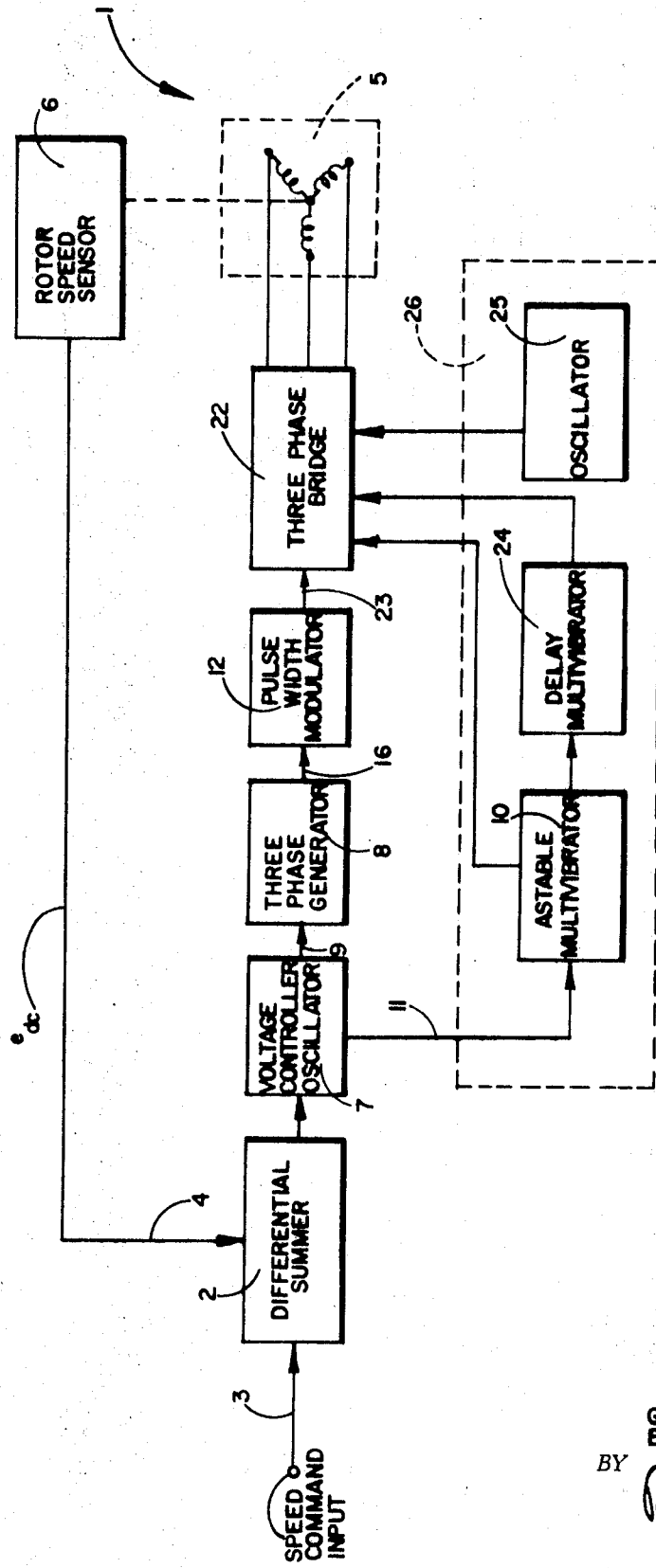
FIG. 1 is a block diagram of one embodiment of the system for controlling the motor speed.

FIG. 1 is a block diagram of a polyphase motor control system 1 comprising differential summer 2 which receives an input signal on line 3 and a signal on line 4 which is derived from the output of polyphase motor 5. The output signal on line 4 is a DC voltage having a magnitude which is dependent on the speed of the rotor of the three-phase motor 5.

The speed is sensed by sensor 6, which may be a magnetic pick or any other suitable device. The DC voltage is then summed with the input signal on line 3. In the preferred embodiment, the input signal on line 3 is a DC voltage although in other embodiments the input signal could be an AC signal. In the latter case, it would be necessary to incorporate an AC to DC converter in the summer 2.

The differential summer may be implemented by an integrated operational amplifier, the details of which are known to persons skilled in the art. In systems where a variable torque control is required, a second operational amplifier may be used.

The DC output from summer 2 provides an input to voltage-controlled oscillator (VCO) 7, which generates square wave pulses. The square wave pulses have a frequency which is dependent upon the magnitude of the DC voltage generated by summer 2. In one embodiment, the VCO generates an output pulse at a frequency six times the frequency of the motor. The frequency of the signal will become more significant during the descriptions of FIGS. 5 $a$ and 5 $b$. Voltage-controlled oscillator 7 may be implemented by a unijunction oscillator or a flip-flop with a variable current source for changing the time constant of the circuit as a function of the input voltage. Other voltage-controlled oscillators could also be used.

The square wave pulses from the voltage-controlled oscillator 7 provides a clock signal input into three-phase signal generator 8 via line 9. The output from voltage-controlled oscillator 7 provides a trigger input to astable multivibrator 10 via line 11. The astable multivibrator 10, delay multivibrator 24 and oscillator 25 comprising control circuit 26 are described in more detail in FIG. 52.

The clock signal transformed into three-phase signals by the three-phase generator 8 to provide six inputs to pulse width modulator 12. The three-phase generator may be implemented with three J—K flip-flops, as shown in FIG. 2 $a$.

Figure 2A:
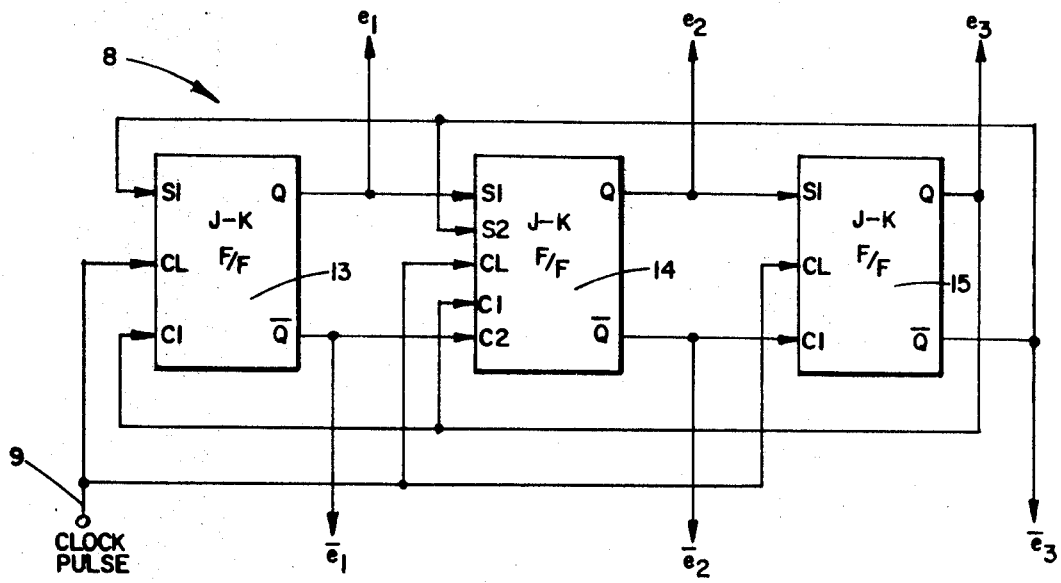
FIG. 2 $a$ is a block diagram of a three-phase signal generator.
Figure 2B:
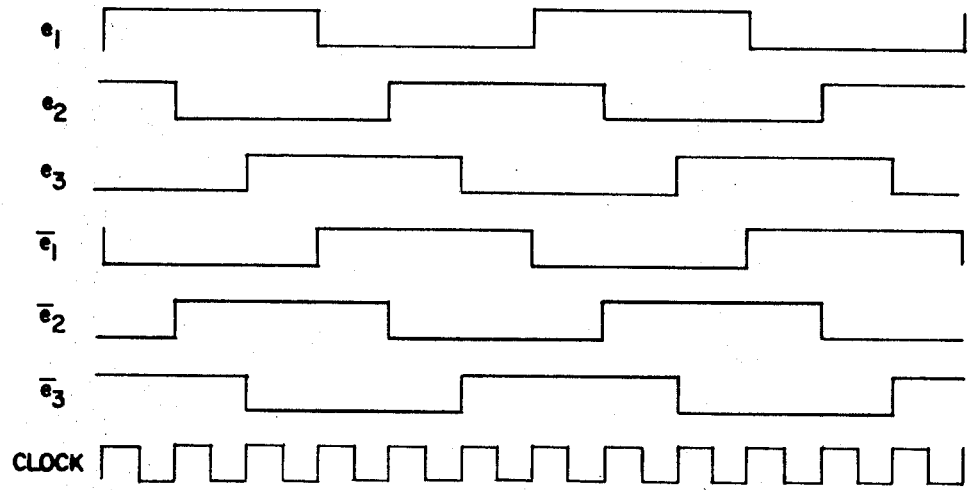

As indicated in FIG. 2 $a$, the output from the voltage-controlled oscillator on line 9 provides simultaneous clock inputs to flip-flops 13, 14 and 15 of three-phase generator 8. The outputs $\overline{e_1}$, $e_1$, $e_2$, $\overline{e_2}$, $e_3$, and $\overline{e_3}$, are taken from the Q and $\overline{Q}$ outputs of the J—K flip-flops. The six output lines are represented by line 16 in FIG. 1.

The wave forms of the outputs $e_1$ through $e_3$, as well as the clock input from VCO, are shown in FIG. 2 b. As indicated in FIG. 2 a, $e_{1\ 120\ and}\ e_1$ are 180° out of phase. The J—K flip-flops trigger on the leading edge of the clock signal.

The frequency of the output signals from the three-phase generator 8 for the particular embodiment shown is seen to be one-sixth of the frequency of the clock signal on line 9. The three-phase clock signals from the flip-flops have a phase separation of 12. electrical degrees.

The pulse width modulator 12 receives the six output signals from three-phase generator 8 and varies the pulse width of each phase such that the voltage applied to motor 5 increases as the frequency of the square wave voltage into the pulse width modulator increases until a maximum pulse width signal is generated. The pulse width decreases as the frequency decreases. The pulse width modulator may be implemented by six one-shot multivibrators for converting the input signals into $\Phi$ output signals. An example of one one-shot multivibrator is shown in FIG. 3.

Figure 3:
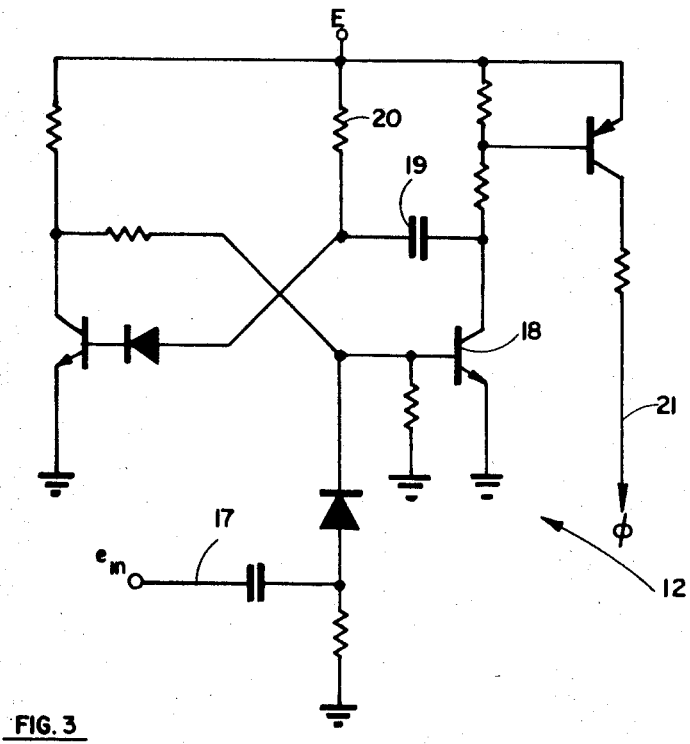
FIG. 3 is a schematic diagram of a pulse width modulator.

As illustrated in FIG. 3, an input signal is received on line 17 for turning on transistor 18. When transistor 18 is turned on, capacitor 19 is charged through resistor 20. The capacitor is permitted to charge as long as transistor 18 is turned on. Therefore, if the input voltage has a reduced width, the output voltage $\Phi$ on line 21 also has a reduced width. The circuit is designed so that for a maximum input voltage, determined as a function of the maximum speed of motor 5, a maximum $\Phi$ output signal will occur.

The time period of each one shot multivibrator is said to be equal to one-half the period of the highest frequency at which the motor operates. For a 60 Hz. motor, the time period is 8.4 milliseconds; and for a 400 Hz. motor, the time period is 1.25 milliseconds. Pulse width modulation is accomplished by the one-shot multivibrator by lowering the frequency of the input voltage. As the frequency of the input pulse decreases, the on-period of the multivibrator relative to the true phase of the input signal decreases.

The outputs from the pulse width modulator 12 provide inputs to three-phase bridge circuit 22 on lines represented generally by numeral 23. The three-phase bridge circuit 22 also receives inputs from astable multivibrator 10, delay multivibrator 24, and oscillator 25 when the three-phase bridge is implemented by silicon-controlled rectifiers as shown in FIG. 52. If the bridge is implemented by power transistors, the control circuit 26 may be eliminated.

Figure 4A:
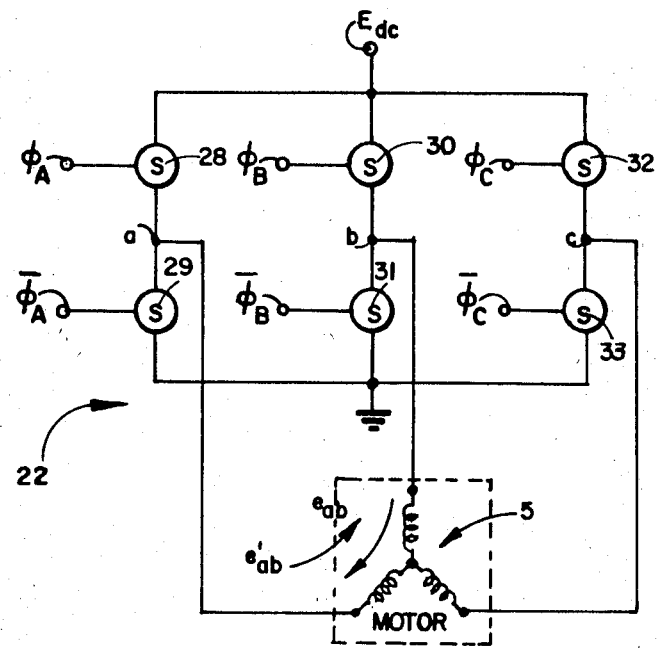
FIG. 4 $a$ is a schematic diagram of a three-phase bridge network.
Figure 4B:
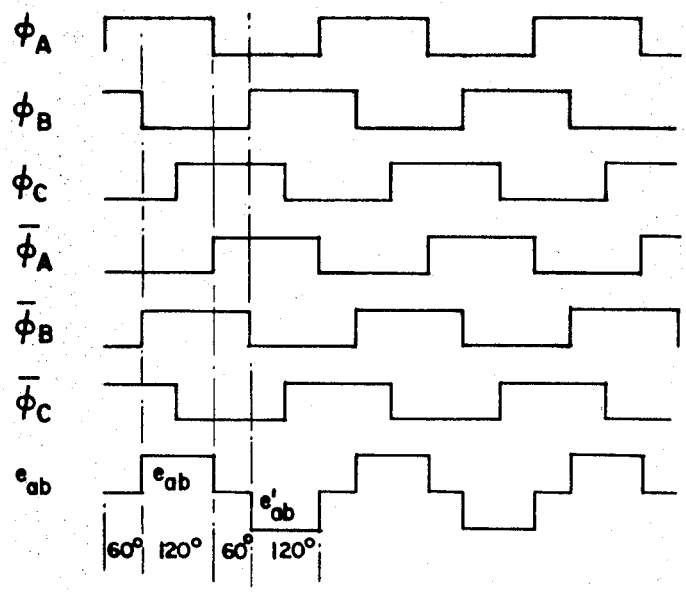

A simplified embodiment of the three-phase bridge is shown in FIG. 4 a. The three-phase bridge 27 receives inputs $\Phi_A$, $\overline{\Phi}_A$, $\Phi_B$, $\overline{\Phi}_B$, $\Phi_C$, and $\overline{\Phi}_C$ for generating stator drive signals for motor 5. The three-phase bridge comprises switches 28, 29, 30, 31, 32, and 33 for switching the voltage $E_{dc}$ across the stator windings of motor J under the control of the input signals $\Phi$ as shown in FIG. 4 b. The control $\Phi$ signals are spaced from each other by 120°.

The voltage across the windings is comprised of the sum of the $E_{dc\ DC}$ voltage as passed through the various switches for the true intervals of the control signals. For example, the voltage between terminals a and b is zero volts during the first 60° since $\Phi_A$ and $\Phi_B$ are both true. However, during the next 60°, switch 31 turns on so that $E_{dc}$ is dropped between terminals $a$ and $b$. As shown in FIG. 4 b, $e_{ab}$ increases during the second and third 60° intervals. During the next 60° interval, $E_{dc}$ is also dropped between terminals a and b. However, during the next 60°, switch 28 is turned off so that the voltage between terminals $a$ and $b$ drops to a zero reference. During the next 60°, switch 29 and switch 30 are turned on so that for two consecutive 60° intervals, a negative voltage, $e_{ab}'$, is impressed across the windings. Thereafter, the cycle continues as previously described. A similar analysis could be made for the voltage between each of the terminals $ac$ and $bc$. It should be obvious that as the frequency of the $\Phi$ signals decreases, the width of the voltage pulse impressed across the windings also decreases. As the pulse width decreases, the speed of the motor decreases. Therefore, as the frequency output from the voltage control oscillator decreases, the width of the voltage pulse impressed across the windings of motor 5 also decreases to control the speed of the motor. Simultaneously, the average value of the voltage decreases so that a constant ratio of voltage/frequency is maintained.

Figure 5A:
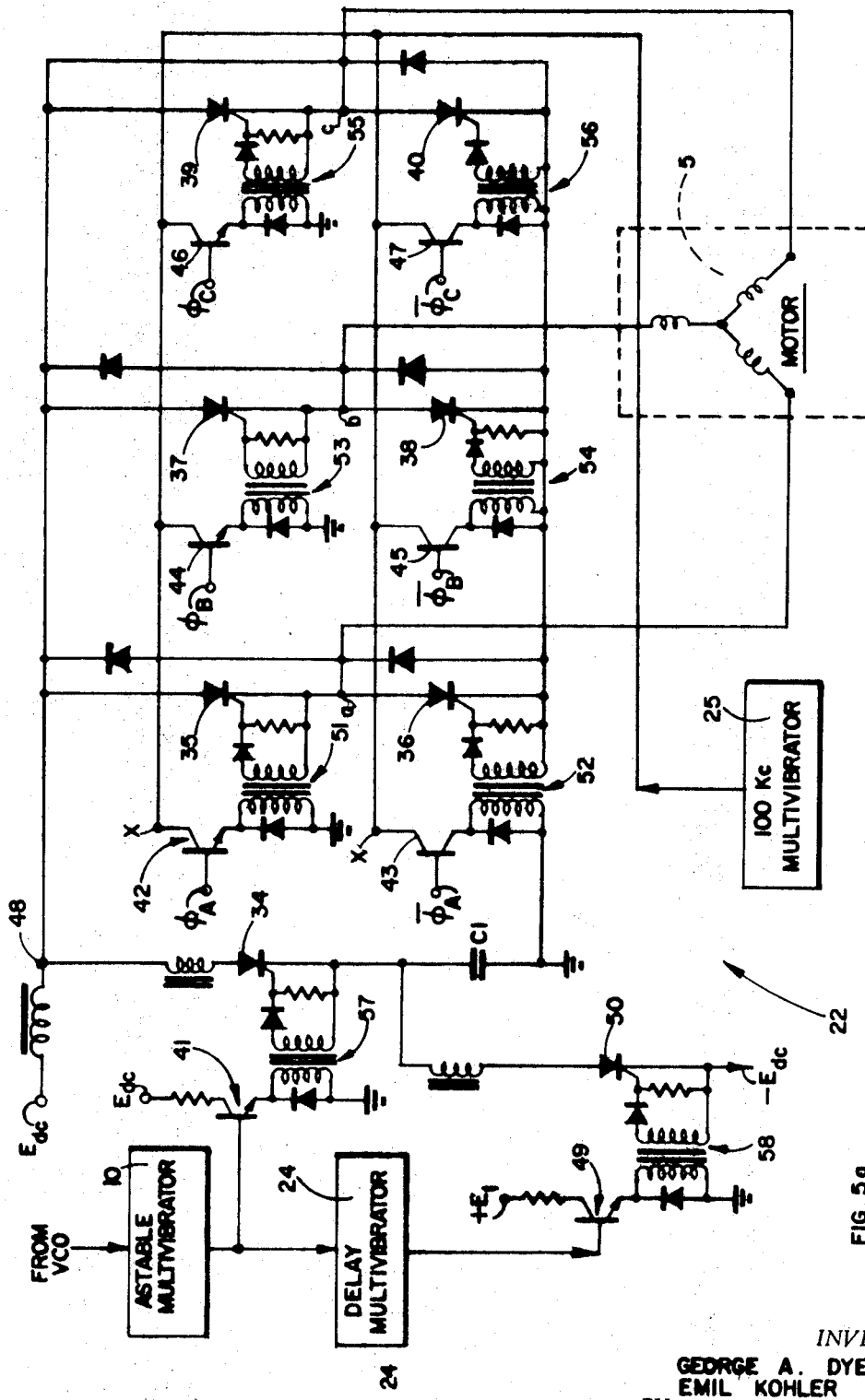
FIG. 5 $a$ is a schematic diagram of one embodiment of a three-phase inverter.
Figure 5B:
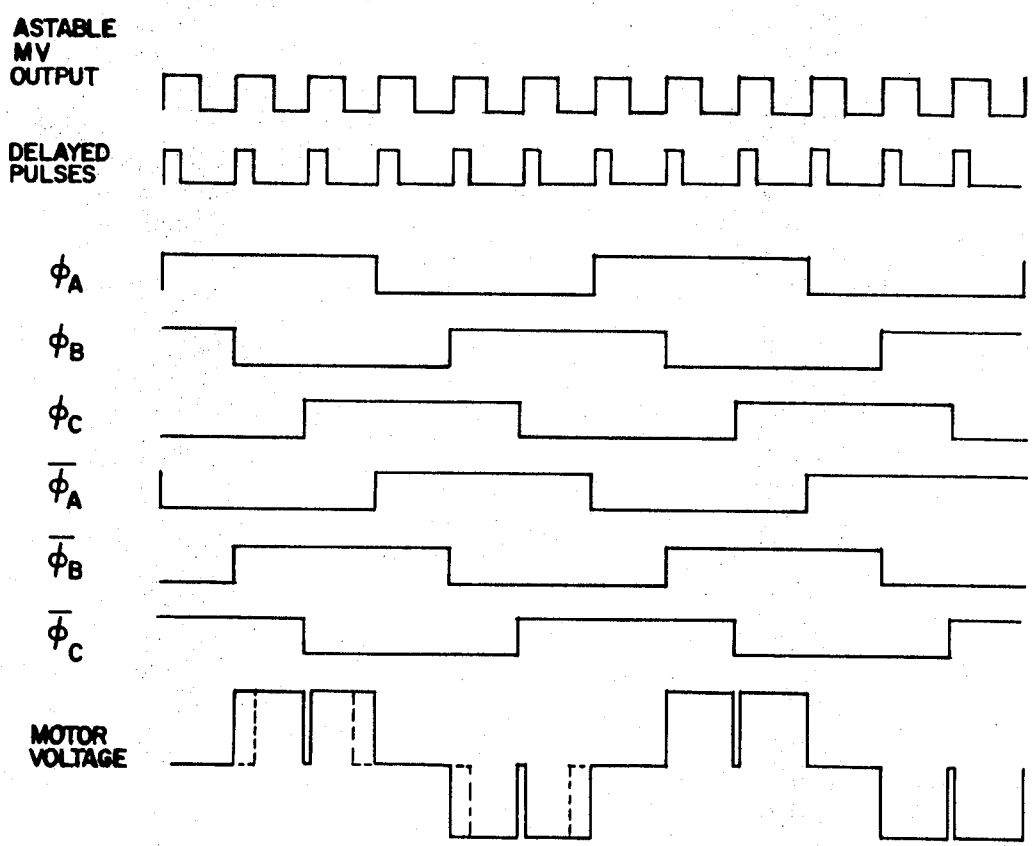

FIG. 5 a illustrates a schematic diagram of a bridge network using silicon controlled rectifiers 35, 36, 37, 38, 39 and 40 as the switches controlled by phase signals $\Phi_A$ through $\overline{\Phi}_C$.

Initially, transistor 41 is turned on by the output signal from the voltage control oscillator which turns on silicon-controlled rectifier (SCR) 34. Pulse transformer 57 transfers the power to turn on SCR 34. When SCR 34 turns on, a negative voltage appears at point 48 to black bias the bridge network comprising SCR's 35—40. After a short delay produced by delay multivibrator 24, transistor 49 is turned on to turn on SCR 50 for charging capacitor C1 from $-E_{dc}$. Pulse transformer 58 transfers the power. The charge of capacitor C1 turns on SCR 34 and permits the bridge network to operate.

Since the frequency of the VCO is six times the frequency of the voltage applied across the motor windings, the SCR's are turned on and off every 60 electrical degrees of operation.

When the applied $E_{dc}$ is constant, the commutating circuit, comprising SCR 34, capacitor C1 and SCR 50, turns the SCR's in the bridge circuit on-and-off in time sequence with the leading and trailing edges from the output of the pulse width modulator 12. As a result, the average voltage applied to the SCR bridge is varied with applied frequency.

The relationship between the VCO output, the delay pulse generated by multivibrator 24, the three phase signals $\Phi_A-\overline{\Phi}_A$ and the summed voltage signal impressed across the stator windings of the motor are shown in FIG. 5 b. The turnoff period is shown every 60° by the motor voltage signal.

The operation of SCR's 35—40 is similar to the operation previously described for the bridge network in FIG. 4 a. Each SCR is turned on at the appropriate time by the square wave voltages $\Phi$ applied to the base electrodes of the associated transistors. For example, SCR 35 is turned on when the true phase of $\Phi_A$ is applied to the base of transistor 42. Signals $\overline{\Phi}_A-\overline{\Phi}_C$ are applied according to the sequence shown in FIG. 5 b to the bases of transistors 42—47 respectively.

The high frequency astable multivibrator supplies collector current to transistor 41 by square wave pulses during the time that each of the transistors 42—47 is turned on by the output signals from the pulse width modulator. The pulses in the secondaries of each of the pulse transformers 51—56 assures that its associated SCR transfers power. The power from the SCR's is summed at terminals $a$, $b$ and $c$ to produce the signal across the motor shown in FIG. 5 b. As indicated by the signal, the bridge network is turned off every 60°. The dotted signal illustrates a reduced motor voltage.

In certain embodiments, the voltage designated by the point x on the collectors of transistors 42—47 may be replaced by the output signal from the oscillator 25 which may be a 100 kc. multivibrator. As a result, the transformers 51—58 (which isolate the SCR gates) may be implemented by relatively small pulse-type transformers. The pulse thus applied to the SCR gates would be a sharp rising wave front to insure turn on by the SCR. Under normal operation, however, a DC voltage is applied at point $x$.

We claim:
1. A system for controlling the speed of a polyphase motor, said system comprising:
   means for generating a voltage representing the difference between a command speed for said motor and the actual speed of said motor,
   voltage-controlled oscillator means responsive to said voltage for generating a signal having a frequency as a function of said voltage,
   means for generating polyphase signals from said signals,
   means for modifying the pulse width of said polyphase signals as a function of the pulse width of said signal,
   said pulse widths being modifiable over a range of widths with the maximum limit being fixed by the maximum speed of said motor, polyphase bridge means for providing a drive signal to said motor under the control of said modified pulse width polyphase signals.

2. The combination recited in claim 1 wherein said means for generating polyphase signals comprises a three-phase signal generator.

3. The combination recited in claim 2 wherein said means for modifying comprises a pulse width modulator for decreasing the width of said three phase signals from a maximum width representing the maximum speed of said motor to a minimum width representing the lowest operating speed of said motor.

4. The combination recited in claim 1 wherein said system further includes an oscillator responsive to said signal for generating a signal having a frequency six times that of the operating frequency of the motor for turning said bridge network off every 60°.

5. The combination recited in claim 1 wherein said polyphase bridge means includes a constant DC power pulse, and wherein the leading and trailing edges of the modified pulse width signals turn said bridge means on-and-off for varying the average power across the bridge means.

6. The combination recited in claim 1 wherein said bridge means has a variable DC power source.

7. The combination recited in claim 1 wherein said system further includes means for generating a signal to turn said bridge network off every 60 electrical degrees, and
   means responsive to said signal for enabling a capacitor to be charged after a short delay,
   means responsive to the capacitor voltage and said pulse width modified polyphase signals for supplying drive voltages to said motor.

8. The system recited in claim 7 further comprising a relatively high frequency signal generator means for providing an input to said bridge means to provide sharp turn on pulses for said bridge means.